United States Patent [19]

Stoyan

[11] Patent Number: 5,002,979

[45] Date of Patent: Mar. 26, 1991

[54] EXTENDED-WEAR LENSES

[75] Inventor: Nick Stoyan, Encino, Calif.

[73] Assignee: Bausch & Lomb Incorporated, Rochester, N.Y.

[21] Appl. No.: 178,897

[22] Filed: Apr. 1, 1988

Related U.S. Application Data

[63] Continuation of Ser. No. 735,381, May 17, 1985, abandoned, which is a continuation-in-part of Ser. No. 722,121, Apr. 10, 1985, abandoned, and a continuation-in-part of Ser. No. 696,014, Jan. 29, 1985, abandoned.

[51] Int. Cl.$^5$ .................. C08F 20/22; C08L 83/06; G02C 7/04
[52] U.S. Cl. .................. 523/107; 526/245; 526/246; 526/279
[58] Field of Search .................. 523/107; 526/245, 246, 526/279

[56] References Cited

U.S. PATENT DOCUMENTS

| | | | |
|---|---|---|---|
| 4,139,692 | 2/1979 | Tanaka et al. | 526/279 |
| 4,235,985 | 11/1980 | Tanaka et al. | 526/279 |
| 4,419,505 | 12/1983 | Ratkowski | 523/107 |
| 4,433,125 | 2/1984 | Ichinohe | 526/279 |
| 4,829,137 | 5/1989 | Stoyan | 526/246 |

Primary Examiner—Charles L. Bowers, Jr.
Assistant Examiner—Lee C. Wright
Attorney, Agent, or Firm—Christie, Parker & Hale

[57] ABSTRACT

There are provided extended-wear lenses formed by polymerizing an organosilicon monomer system, at least a portion of which is a hydroxyorganosilicon monomer, a fluoroorgano monomer, a hydrophilic monomer, and a crosslinking agent. A UV-absorbing agent is optionally present. The product is easily machinable to any prescription, permitting continuous wear, with an oxygen permeability in excess of $50 \times 10^{-11}$(cm$^2$/sec) (ml O$_2$ × mm Hg).

22 Claims, No Drawings

EXTENDED-WEAR LENSES

CROSS-REFERENCE TO RELATED APPLICATIONS

This application is a continuation of application Ser. No. 735,381 filed May 17, 1985, now abandoned which was a continuation-in-part of application Ser. No. 722,121, filed Apr. 10, 1985, now abandoned and this application is also a continuation-in-part of application Ser. No. 696,014, filed Jan. 29, 1985, now abandoned.

BACKGROUND OF THE INVENTION

The present invention is directed to eye-compatible lenses, particularly hard contact lenses having excellent oxygen permeability and wettability.

Contact lenses presently on the market are classified into two large groups: soft contact lenses and hard contact lenses. Hard contact lenses are better able than soft contact lenses to retain visual characteristics, but are less comfortable. The art has sought to increase oxygen permeability of hard contact lenses, to extend the length of time they can be worn without causing corneal damage or discomfort.

One proposed solution has been the formation of a copolymer of methyl methacrylate and a siloxane methacrylate compound. This solution has been less than satisfactory, since the lenses offered are not as hard, rigid, nor wettable as lenses formed from polymethyl methacrylate. In addition, such lenses are fragile and have poor mechanical processability.

The object of the present invention is to overcome the deficiencies in the state of the art by offering lenses having a high degree of oxygen permeability, excellent wettability, and, if desired, ultraviolet absorption. The primary benefit of UV absorptivity is the resistance to user development of cataracts.

SUMMARY OF THE INVENTION

The present invention is directed to eye-compatible, oxygen-permeable lenses of excellent wettability, formed of copolymers of an organosilicon monomer system which preferably comprises an organosilane or an organosiloxane of the general formula:

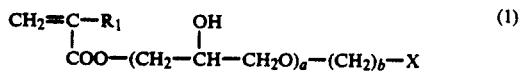
(1)

wherein $R_1$ is hydrogen or methyl, a is 0 or 1, b is from 1 to about 4, and X is an organosilicon moiety containing up to about 16 silicon atoms. At least a portion, and as much as 100 percent, of the organosilicon monomer system is a hydroxyorganosilicon monomer which is a monomer having at least one hydroxyl group bonded to silicon. Preferably from 0.1 to about 10 percent by weight of the monomers is a hydroxyorganosilicon monomer.

A second component is a fluoroorgano monomer of the formula:

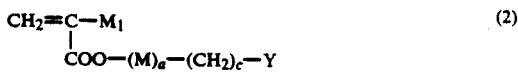
(2)

wherein $M_1$ is hydrogen, alkyl, fluoroalkyl, alkyl carboxy, carboxy ester, alkyl carboxy ester, fluorinated carboxy ester, fluorinated alkyl carboxy ester, cyano, or phenyl, M is hydroxy alkyl, alkyl ether, or hydroxy alkyl ether, a is as defined above, c is from 0 to 4, and Y is a fluorocarbon group, preferably containing from about 2 to about 21 fluorine atoms. At least one hydrophilic monomer is included, preferably an unsaturated carboxylic acid capable of inducing wettability, and is present in an amount sufficient to provide in the resultant polymer a receding contact angle of about 45° or less. Methacrylic acid is preferred. A UV-absorbing agent, if desired, may be included. In this instance, the UV-absorbing agent may be a UV-absorbing monomer, preferably a hydroxybenzophenone or a benzotriazole compound of the formula:

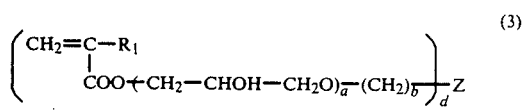
(3)

wherein $R_1$, a and b are as defined above, d is 1 or 2, and Z is:

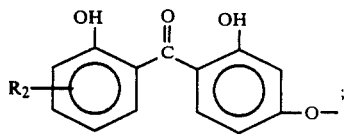

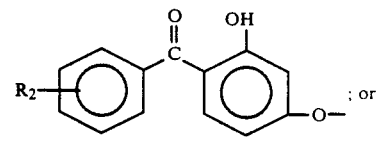
; or

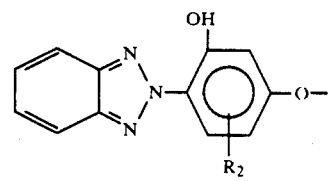

wherein $R_2$ is hydrogen, alkyl or hydroxy. Alternately or in addition, the UV-absorbing monomer may be a benzotriazole of the formula:

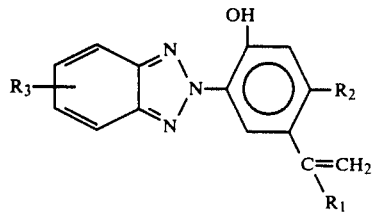

wherein $R_1$ and $R_2$ are as defined above, and $R_3$ is H or alkyl, preferably a $C_1$-$C_{10}$ alkyl. Alternately, UV-absorbing agents may be non-reactive homopolymers and copolymers preferably containing the UV monomers which are added to the monomer system undergoing reaction, and which become physically entrained in the formed lens.

A final component is a crosslinking monomer which is a crosslinking agent, preferably an organosilicon monomer, present in an amount up to about 5, preferably up to about 2, percent by weight based on the total weight of the monomers.

It has been found that the total organosiliconmonomer content of the polymer may range from about 10 to about 40 percent by weight, preferably from about 15 to about 35 percent by weight based on the total weight of the monomers. The hydrophilic monomer may be present in an amount of from about 1 to about 15 percent by weight, preferably from about 2 to about 10 percent by weight based on the total weight of the monomers. The UV-absorbing agent if present, whether monomeric or not, may be present in an amount of from about 0.1 to about 20 percent, preferably from about 2 to about 10 percent by weight based on the total weight of the monomers and/or agent, and the crosslinking monomer may be present in an amount up to about 2 percent by weight based on the total weight of the monomers. The balance of the monomer system may be solely the fluoroorgano monomers. It is desired that the lens have a Shore D hardness greater than about 78, preferably from about 80 to about 85. There may be desirably included other monomers, such as acrylates, methacrylates, itaconic esters, styrenes, fluorinated styrenes, alkyl styrenes, fluorinated alkyl styrenes, and the like, present in a concentration of up to about 50 percent by weight of the concentration of the fluoroorgano monomer, typically up to about 5 percent by weight based on the total weight of the monomers which can effectively be used to modify properties such as hardness, machinability, wettability, oxygen permeability, and the like.

It is desired to provide an oxygen permeability at 35° C. greater than $50 \times 10^{-11}$(cm$^2$/sec)(ml O$_2$ $\times$ mm Hg). When using low-cost fluoroorgano compounds such as 2,2,2-trifluoroethylmethacrylate, the organosilicon content of the monomer system must be high, typically in the range of from 25 percent to 30 percent or more by weight based on the total weight of the monomers. Organosilicon monomer content can be advantageously reduced, however, by inclusion of high-performance fluoroorganomonomers such as hexafluoroisopropyl esters of an unsaturated carboxylic acid containing from 2 to about 6 carbon atoms and 1 or 2 carboxyl groups, preferably hexafluoroisopropylmethacrylate.

DETAILED DESCRIPTION

The present invention is directed to eye-compatible, i.e., ocular-compatible, lenses, in particular, hard contact lenses formed of an interpolymerized amount of an organosilicon monomer system containing at least one hydroxyorganosilicon monomer, at least one fluoroorgano compound, at least one monomeric unsaturated carboxylic acid hydrophilic monomer, and, if desired, a UV-absorbing agent, which may be a monomer formed of a monomer which is a benzotriazole and/or benzophenone and at least one crosslinking monomer. Other reactive monomers such as acrylates, methacrylates, itaconic esters, styrenes, fluorinated styrenes, alkyl styrenes, fluorinated alkyl styrenes, and the like, may be included as part of the polymerizable composition, to achieve a lens of desired hardness for machinability, wettability, oxygen permeability, and the like, and can be present in an amount of up to about 50 percent by weight of the fluoroorgano monomer content of the polymers.

The organosilicon monomers which may be used in accordance with the instant invention include organosilicon monomers which are organosilanes and/or organosiloxanes of the general formula:

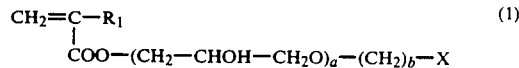

wherein $R_1$ is hydrogen or methyl, a is 0 or 1, b is from 1 to about 4, and X is an organosilicon moiety containing up to about 26 silicon atoms. At least a portion or all of the organosilicon monomer system is a hydroxyorganosilicon monomer, namely, a monomer having at least one hydroxyl group bonded to silicon.

Preferred organosilicon compounds are acrylates and methacrylates of the general formula:

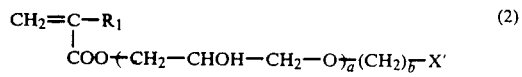

wherein X' is

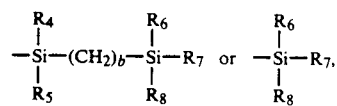

each of $R_4$ and $R_5$ is independently a $C_1$-$C_5$ alkyl, phenyl, hydroxyl, or —O—Si(CH$_3$)$_3$, and each of $R_6$, $R_7$ and $R_8$ is independently selected from $C_1$-$C_5$; —CH$_2$=CH$_2$; phenyl; hydroxyl; —CH$_2$OH;

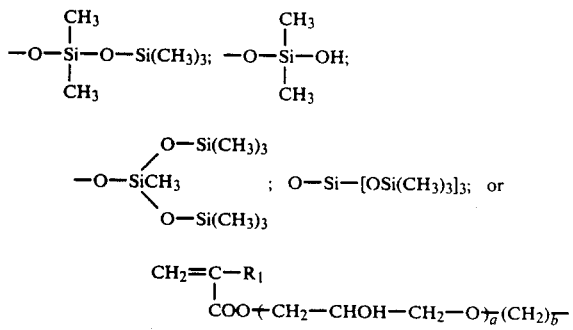

wherein $R_1$, a, and b are as defined above.

The representative monomers included are: tris(-trimethylsiloxy)silylpropylmethacrylate, 1,3-bis($\gamma$-methacryloxypropyl)-1,1,3,3-tetra(trimethylsiloxy)-disiloxane, vinyl di(trimethylsiloxy)silylpropylmethacrylate, pentamethyldisiloxy-$\gamma$-methacryloxypropylsilane, trimethylsilylpropylmethacrylate, methyl di(-trimethylsiloxy)silylpropylmethacrylate, and tris(trimethylsiloxy)silylpropylglycerolmethacrylate, and the like. Tris(trimethylsiloxy)-$\gamma$-methacryloxypropylsilane is presently preferred. Another important monomer is 1,3-bis-($\gamma$-methacryloxypropyl)-1,1,3,3-tetra(trimethylsiloxy)disiloxane, as it serves as a crosslinking agent without sacrificing oxygen permeability. When used for this purpose, concentration may vary from about 0.1 to about 2 parts by weight based on the total weight of the reactants.

Representative hydroxyorganosilicon monomers include hydroxy-di(trimethylsiloxy)silylpropyl methacrylate, hydroxy-di(trimethylsiloxy)-$\gamma$-methacryloxypropyl silane, hydroxy-methyl(trimethylsiloxy)methacryloxymethyl silane, hydroxy-methyl(trimethylsiloxy)methacryloxyethyl silane, hydroxy-methyl(trimethylsiloxy)methacryloxypropyl silane, hydroxy-di(trimethylsiloxy)-γ-methacryloxyethyl silane, hydroxy-di(-trimethylsiloxy)-methacryloxy methyl silane, hydroxy-(trimethylsiloxy)-(pentamethyldisiloxy)-methacryloxymethyl silane, hydroxy-(trimethylsiloxy)-(pentamethyldisiloxy)-γ-methacryloxyethyl silane, and the like. Hydroxy-di(trimethylsiloxy)silylpropyl methacrylate is preferred.

Other useful organosilicon monomers are disclosed in U.S. Pat. Nos. 4,152,508 to Ellis; 4,153,641 to Deichert et al; 4,189,546 to Deichert et al; and 4,463,149 to Ellis, each incorporated herein by reference.

While total concentrations of organosilicon monomers may range from about 10 to about 40 parts by weight based on the total weight of the monomers, the preferred range is from about 15 to about 35 parts by weight. Oxygen permeability (all other factors being constant) will increase with an increase in organosilicon monomer content. At higher levels, the lens becomes more difficult to machine, requiring inclusion of monomers such as acrylates, methacrylates and the like, may be employed as part of the monomer system to yield a lens having a Shore D hardness greater than about 78, preferably from about 80 to about 85. Oxygen permeability and wettability of the lens is enhanced by the presence of the hydroxyorganosilicon monomer. Although the presently preferred concentration of the hydroxyorganosilicon monomer is from about 0.1 to about 10 percent by weight of the total monomer, it may be the exclusive organosilicon monomer, except for any multifunctional organosilicon monomer used as a crosslinking monomer.

The fluoroorgano monomers utile in the practice of the instant invention are generally compounds of the formula:

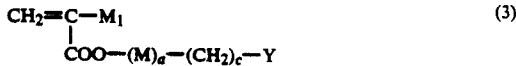

wherein $M_1$ is hydrogen, alkyl, fluoroalkyl, alkyl carboxy, carboxy ester, alkyl carboxy ester, fluorinated carboxy ester, fluorinated alkyl carboxy ester, cyano, or phenyl, M is hydroxy alkyl, alkyl ether, or hydroxy alkyl ether, a is as defined above, c is from 0 to 4, and Y is a fluorocarbon group. Preferably, Y has the general formula:

$C_nF_{2n+1}$ or $C_nF_{2n}H$. High-performance fluorinated compounds are hexafluoroisopropyl esters of unsaturated carboxylic acids containing from 2 to about 10 carbon atoms and 1 or 2 carboxyl groups.

Illustrative of fluoroorgano monomers are: 2,2,2-trifluoroethylmethacrylate, hexafluorobutylmethacrylate, hexafluoroisopropylmethacrylate, pentafluoro-n-propylmethacrylate, and the like. Hexafluoroisopropylmethacrylate is the preferred monomer for oxygen permeability, with 2,2,2-trifluoroethylmethacrylate being preferred for cost. Perfluoro or fluorinated styrenes may also be used.

Hydrophilic monomers are included in the composition to induce wettability. They preferably comprise an unsaturated carboxylic acid, most preferably methacrylic acid, for compatability of monomers and wearer comfort. Acrylic acid is functional but less desirable. Other monomers such as 2-hydroxyethylmethacrylate, vinyl pyrrolidone, and the like may be used. Concentration may be from about 0.1 to about 15 or more percent by weight, preferably from about 2 to about 10 percent by weight based on the total weight of the monomers.

The amount of hydrophilic monomer present depends on whether a UV-absorbing agent, as described below, is employed, as the latter also has the capability of being hydrophilic. If a UV-absorbing agent is employed, whether in monomeric or polymeric form, its concentration may range from about 0.1 to about 20 percent by weight, preferably from about 2 to about 10 percent by weight based on the total weight of the monomers and agent. The UV-absorbing agents used herein cooperate with the hydrophilic monomer to induce wettability and antisepticability, i.e., self-sterilizable, in consequence of hydroxy-substituted benzene moieties. In the polymerized state, the UV-absorbing agents absorb in the range of from about 300nm to about 450nm, preferably with no less than about 70% UV radiation at 370nm. Preferred UV-absorbing agents are, or are formed of, monomers of the formula:

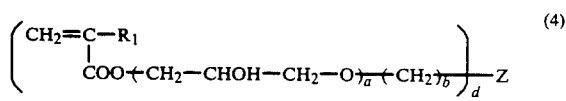

wherein $R_1$ is hydrogen or methyl, a is 0 or 1, is from about 1 to about 3, d is 1 or 2, and Z is:

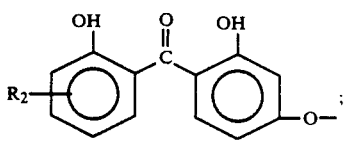

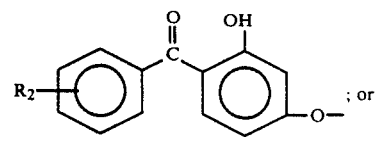

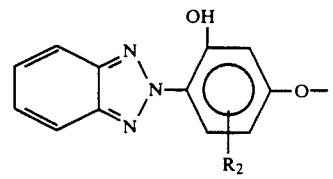

wherein $R_2$ is hydrogen; an alkyl, preferably a $C_1-C_5$ alkyl or hydroxyl, and c is 1 or 2. In the alternative or in addition, there may be employed a phenyl benzotriazole of the formula:

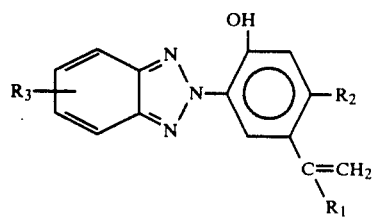

wherein $R_1$ and $R_2$ are as defined above, preferably a $C_1-C_{10}$ alkyl, and $R_3$ is H, alkyl, preferably a $C_1-C_{10}$ alkyl, or hydroxyl.

Preferred UV-absorbing monomers for forming agents include: 2-hydroxy-4-(2-methacryloyloxyethoxy)benzophenone, 2-hydroxy-4-(2-acryloyloxyethoxy)- benzophenone, 2-hydroxy-4-(2-hydroxy-3-methacryloxypropyl)benzophenone, 2-(2-hydroxy-5-vinylphenyl)-2H-benzotriazole, and the like. They may be added to the monomer system and interpolymerized therewith, or added as part of the non-reactive homopolymers and copolymers which are added to the monomer system and are physically entrained in the final polymer formed.

The hard contact lenses of the instant invention are formulated to have high oxygen permeability (Dk) of at least about 15 and preferably greater than 50, as expressed in units of $10^{-11}(cm^2/sec)(ml\ O_2 \times mm\ Hg)$ and as determined at 35° C. Values are achieved using high concentrations of the organosilicon monomer and/or selection of the fluoroorgano monomer. With compositions of high organosilicon-monomer content there are displayed increased brittleness and a reduction in capability to undergo machining. At least one crosslinking agent, such as a multi-functional organosilicon monomer, a fluoroorgano monomer, an acrylate and/or a methacrylate, is employed in an amount sufficient to control hardness of the lens in the range of Shore D hardness of from about 80 to about 85. A highly multifunctional organosilicon monomer is preferred, as it does not interfere with oxygen permeability. Other crosslinking agents which may be used include ethylene glycol dimethacrylate, ethylene glycol diacrylate, diethylene glycol dimethacrylate, diethylene glycol diacrylate, and the like.

Lens formation is by free radical polymerization such as azobisisobutyronitrile (AIBN) and peroxide catalysts under conditions set forth in U.S. Pat. No. 3,808,179, incorporated herein by reference. Colorants and the like may be added prior to monomer polymerization. It is preferred to form the lens base in sheet form between layers of a non-adherent surface. The sheet is cut into smaller lense precursors from which the lens is ground to user specifications. Spin-casting, as described for instance in U.S. Pat. No. 3,408,429, incorporated herein by reference, may also be used.

Without limiting, the following Examples are illustrative of the instant invention. With reference to the Examples, properties of the contact lenses were measured according to the following methods.

Oxygen permeability values were determined using a test method developed by Dr. Irving Fatt of Berkeley, California. The instrument was a polarographic cell with a curved surface for finished lenses, polarographic amplifier, recorder and a constant temperature chamber equipped with a temperature control unit. The measurements were made at 35° C. and the units of oxygen permeability (Dk) are $(cm^2/sec)(ml\ O_2 \times mm\ Hg)$.

The water wettability of the contact lense material was determined by the sesile drop method using a Rame-Hart goniometer with an environmental chamber. Both the advancing and the receding contact angles were determined.

The hardness was measured as Shore D at 22° C using a hardness tester, and percent light transmission was measured using a recording spectrophotometer.

The absorption spectra of the copolymer were determined on a "Perkin Elmer" UV-Vis spectrophotometer using 0.1–0.15mm-thin optically polished discs. The amount of materials extractable from the lenses were evaluated by first storing them in a saline solution for 10 days at 35° C. The lenses were then rinsed with distilled water, dried, weighed, and placed in stoppered, 25cc volumetric flasks, again containing saline as the extracting medium. The saline was analyzed daily for its extracted ultraviolet absorber by placing 4cc of the extract in a spectrophotometer cell and determining the absorption at 320nm. The absorption values were compared against the calibration curve made for the pure ultraviolet absorber Extractables can also be determined by the Soxhlet extraction method, using water as the solvent. The amount of extractables was determined only for a few of the materials in the Examples. Based on 0.04 gr average lens weight, extractables were found, on the average, to be less than $1 \times 10^{-4}$ mc grams/lens/day.

For a few selected copolymer materials, the leachability-diffusibility was evaluated by cytotoxicity assayagar overlay method.

The assay is based on the method described by Guess, W.L., Rosenbluth, S.A., Schmidt, B., and Autian, J., in "Agar Diffusion Method for Toxicity Screening of Plastics on Cultured Cell Monolayers", J. Pharm. Sci. 54:1545–1547, 1965, incorporated herein by reference, and is designed to detect the response of a mammalian monolayer cell culture to readily diffusible components from materials or test solutions applied to the surface of an agar layer overlaying the monolayer.

The response of the cell monolayer is evaluated, with respect to the discoloration of the red-stained monolayer, under and around the sample when the petri dish is viewed against a white background. Loss of color of the stained cells is considered to be a physiologically significant reaction of the cells. The extent of discoloration is confirmed by examination of the monolayer on an inverted microscope, and the extent of lysis of the cells within the discoloration zone is estimated. Typically, discoloration of cells precedes lysis, as manifested by a region and a region showing lysis. A sample is reported as "cytotoxic" only if lysis is observed.

Examples 1–11 and Controls A–F

Candidate lens compositions were formulated as shown in Table I. The mixture was homogenized, degassed and placed in a polymerization cell made of. two glass plates separated by a seal and held together by spring clamps. After filling, the cell was purged with nitrogen, sealed and placed in a circulating water bath at 60° C. for 10 hours. After the initial polymerization period, the cell was heated at 80° C. for 3 hours, 100° C. for one hour, and then allowed to cool to room temperature. The clamps were then removed and the transparent sheet heated for 2 hours at 100° C. The plastic sheet, about ¼-inch in thickness, was cut into squares, then formed to discs which were used to prepare corneal contact lenses using conventional hard-contact-lens-making equipment. The properties of the lens materials are also shown in Table I.

Of the controls, Control A was too brittle to be used as a functional lens, and brittleness was attributed to excessive organosilicon-monomer content. The brittleness of the remaining control was attributed to the level of silicon monomer employed and an excessive amount of a crosslinking and/or wetting monomer.

Controls G–U

Following the procedure of Examples 1–11, there were prepared a number of polymers of the formulations shown in Table II. Polymers of Controls G-0 and U failed because they could not retain their radius of curvature. Failure was attributed to too high an organosiliconmonomer content. Controls P-I were too brittle to be machinable. They shattered in the lathe.

AIBN. The properties of this lens material are shown in Table III.

TABLE I

| | Examples 1-11 and Controls A-F | | | | | | | | | | | | | | | | |
|---|---|---|---|---|---|---|---|---|---|---|---|---|---|---|---|---|---|
| | Examples 1-11 (parts by weight) | | | | | | | | | | | Controls A-F (parts by weight) | | | | | |
| | 1 | 2 | 3 | 4 | 5 | 6 | 7 | 8 | 9 | 10 | 11 | A | B | C | D | E | F |
| Reactant | | | | | | | | | | | | | | | | | |
| Tris(Trimethylsiloxy)silylpropylmethacrylate | 26 | 9.5 | 19 | 29 | 17 | 17 | 17 | 19 | 19 | 17 | 17 | 44 | 19 | | 8 | | 29 |
| 1,3-bis(γ-methacryloxypropyl)-1,1,3,3-tetra (trimethylsiloxy)disiloxane | .04 | 0.1 | 0.1 | 0.1 | 0.3 | 0.3 | 0.3 | 0.1 | 0.1 | 0.3 | 0.3 | 0.6 | 0.1 | | 0.2 | | 0.1 |
| Vinyl di(trimethyldisiloxy)silylpropylmethacrylate | | | | | | | | | | | | | | | | 30 | |
| Pentamethyldisiloxy-γ-methacryloxypropylsilane | | | | | | | | | | | | | | 30 | 10 | | |
| Hydroxy-di(trimethylsiloxy)silylpropylmethacrylate | 3.6 | 0.4 | 0.9 | 0.9 | 2.7 | 2.7 | 2.7 | 0.9 | 0.9 | 2.7 | 2.7 | 5.4 | 0.9 | | 1.8 | | 0.9 |
| 2,2,2-trifluoroethylmethacrylate | | 85 | 75 | 65 | 73 | 73 | 73 | | | 75.5 | 75 | | 70 | 58 | 70 | 60 | 65 |
| Hexafluorobutylmethacrylate | | | | | | | | 75 | | | | | | | | | |
| Hexafluoroisopropylmethacrylate | | | | | | | | | 75 | | | | | | | | |
| Methylmethacrylate | 55 | | | | | | | | | | | 35 | | | | | |
| n-Butylmethacrylate | | | | | 2 | | | | | | | | | | | | |
| Cyclohexylmethacrylate | 10 | | | | | 2 | | | | | | 10 | | 5 | 5 | | |
| 2-Ethylhexylmethacrylate | | | | | | | 2 | | | | | | | | | | |
| Methacrylic Acid | 5 | 5 | 5 | 5 | 5 | 5 | 5 | 5 | 5 | 2 | 5 | 5 | 5 | 5 | | 8 | |
| 2-Hydroxyethylmethacrylate | | | | | | | | | | 2 | | | 5 | | 5 | | 5 |
| Ethyleneglycoldimethacrylate | | | | | | | | | | 0.5 | | | | 2 | | 2 | |
| AIBN | .02 | .02 | .02 | .02 | .02 | .02 | .02 | .02 | .02 | .02 | .02 | .02 | .02 | .02 | .02 | .02 | .02 |
| Properties | | | | | | | | | | | | | | | | | |
| Oxygen Permeability* | 12 | 15 | 28 | 92 | 24 | 24 | 24 | 42 | 234 | 24 | 24 | 28 | 25 | 37 | 24 | 39 | 93 |
| Contact Angle, receding | 28 | 23 | 25 | 28 | 25 | 25 | 25 | 26 | 28 | | 22 | 25 | 15 | 28 | 28 | 25 | 26 |
| Light Transmission | T | T | T | T | T | T | T | T | T | | T | T | T | T | T | T | T |
| Hardness | 87 | 87 | 84 | 80 | 80 | 84 | 80 | 78 | 79 | 84 | 85 | 82 | 83 | 82 | 84 | 82 | 85 |
| Others | | | | | | | | | | | | B | B | B | B | B | B |
| Cytotoxicity Assay | | N | N | N | | | | N | N | N | | N | N | | | | N |

T = transparent
B = brittle
N = negative
*× 10⁻¹¹ (cm²/sec)(ml O₂ × mm Hg)

TABLE II

| | Controls G-U | | | | | | | | | | | | | | |
|---|---|---|---|---|---|---|---|---|---|---|---|---|---|---|---|
| | Controls G-U (parts by weight) | | | | | | | | | | | | | | |
| | G | H | I | J | K | L | M | N | O | P | Q | R | S | T | U |
| Monomers | | | | | | | | | | | | | | | |
| Tris(Trimethylsiloxy)silylpropylmethacrylate | 44.5 | 44.5 | 44.5 | 44.5 | 44.5 | 44.5 | 44.5 | 44.5 | 44.5 | 44.5 | 44.5 | 34.6 | 44.5 | 34.6 | 39.5 |
| 1,3-bis(γ-methacryloxypropyl)-1,1,3,3-tetra (trimethylsiloxy)disiloxane | 0.1 | 0.1 | 0.1 | 0.1 | 0.1 | 0.1 | 0.1 | 0.1 | 0.1 | 0.1 | 0.1 | 0.1 | 0.1 | 0.1 | 0.4 |
| Hydroxy-di(trimethylsiloxy)silylpropylmethacrylate | 0.4 | 0.4 | 0.4 | 0.4 | 0.4 | 0.4 | 0.4 | 0.4 | 0.4 | 0.4 | 0.4 | 0.3 | 0.4 | 0.3 | 0.1 |
| 2,2,2-trifluoroethylmethacrylate | 25 | 25 | 25 | 25 | 25 | 20 | 20 | 20 | 20 | 30 | 35 | 45 | 35 | 45 | 20 |
| Ethylmethacrylate | 25 | | | | | | | 25 | | | | | | | |
| Isopropylmethacrylate | | 25 | | | | | | | | | | | | | |
| n-Butylmethacrylate | | | 25 | | | | | | | | | | | | |
| Cyclohexylmethacrylate | | | | 25 | | | | | | | | | | | |
| t-Butylmethacrylate | | | | | 25 | 25 | 25 | | 25 | | | | | | |
| Methacrylic Acid | | | | | | | 5 | 5 | | 15 | | 15 | | | 15 |
| 2-Hydroxyethylmethacrylate | | | | | | 15 | 5 | | | 10 | 15 | | 15 | 15 | 10 |
| Ethyleneglycoldimethacrylate | 5 | 5 | 5 | 5 | 5 | 5 | 5 | 5 | 5 | 5 | 5 | 5 | 5 | 5 | 5 |
| AIBN | .02 | .02 | .02 | .02 | .02 | .02 | .02 | .02 | .02 | .02 | .02 | .02 | .02 | .02 | .02 |
| Properties | | | | | | | | | | | | | | | |
| Oxygen Permeability* | 50 | 110 | 65 | 80 | 92 | 45 | 67 | 92 | 66 | 92 | | | | 85 | |
| Hardness | 84 | 80 | 82 | 78 | 79 | 80 | 78 | 80 | 79 | 74 | | | | | 78 |

Example 12

Following the procedure of Examples 1-11, an oxygenpermeable copolymer was prepared from a mixture of 22 parts by weight tris(trimethylsiloxy)-γ-methacryloxypropylsilane, 2.7 parts by weight hydroxy-di(trimethylsiloxy)silylpropylmethacrylate, 0.3 parts by weight 1,3 bis(γ-methacryloxypropyl)-1,1,3,3-tetra(trimethylsiloxy)disiloxane, 65 parts by weight trifluoroethylmethacrylate, 5 parts by weight 2-hydroxy-4-(2-acryloxyethoxy)benzophenone, 5 parts by weight methacrylic acid, and 0.02 parts by weight

TABLE III

| Oxygen Permeability | 54 |
|---|---|
| Contact Angle | 20 |
| Light Transmission | Transparent |
| Hardness | 84 |
| Cytotoxicity Assay | Negative |

Example 13

The procedure of Examples 1-11 was repeated, except that the formulation contained 28.5 parts by weight tris(trimethylsiloxy)-γ-methacryloxypropylsilane, 1.3 parts by weight hydroxy-di(trimethylsiloxy)silylpropylmethacrylate, 0.2 parts by weight 1,3 bis(γ-methacryloxy-propyl)-1,1,3,3-tetra(trimethylsiloxy)disiloxane, 65 parts by weight hexafluoroethylmethacrylate, 5 parts by weight methacrylic acid, and 0.2 parts by weight AIBN. AVerage oxygen permeability was $398 \times 10^{-11} (cm^2/sec)$ (ml $O_2$ × mm Hg).

What is claimed is:

1. An oxygen-permeable contact lens formed of a copolymer of monomers comprising:

a) an organosilicon monomer system present in an amount of from about 30 to about 40 percent by weight based on the total weight of the monomers which includes at least one hydroxyorganosilicon monomer having at least one hydroxyl group attached to silicon;

b) at least one hydrophilic monomer present in an amount sufficient to provide in the resultant polymer a contact angle of less than about 45°;

c) at least one crosslinking monomer, the total of cross-linking monomer being present in an amount up to about 5 percent by weight based on the total weight of the monomers; and d) at least on fluoro-organo monomer of the formula:

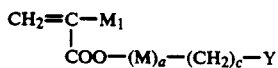

wherein $M_1$ is hydrogen, alkyl, fluoroalkyl, alkyl carboxyl, carboxy ester, alkyl carboxy ester, fluorinated carboxy ester, cyano, or phenyl, M is hydroxy alkyl, alkyl ether, or hydroxy alkyl ether, a is 0 or 1, c is from 0 to 4, and Y is a fluorocarbon group containing from about 2 to about 21 fluorine atoms and from 1 to about 10 carbon atoms present in a positive amount up to about 65 percent by weight of the monomers, said oxygen permeable lens having a Shore D hardness greater than about 78.

2. An oxygen-permeable lens as claimed in claim 1 which the organosilicon monomer system includes monomers of the formula

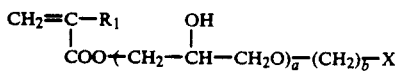

wherein $R_1$ is hydrogen or methyl, a is 0 or 1, b is from 1 to about 4, and X is an organosilicon moiety containing up to about 16 silicon atoms.

3. An oxygen-permeable lens as claimed in claim 1 in which at least one hydroxybenzophenone or benzotriazole UV-absorbing agent is present in an amount of from about 0.1 to about 20 percent by weight based on the weight of the UV-absorbing agent and the monomers.

4. An oxygen-permeable lens as claimed in claim 3 in which the UV-absorbing agent comprises a polymerized amount of at least one monomer selected from the group consisting of a hydroxybenzophenone or benzotriazole of the formula:

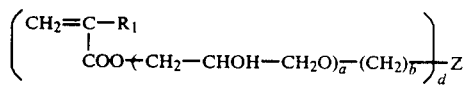

wherein $R_1$, is hydrogen or methyl a is 0 or 1, b is from 1 to about 4, d is 1 or 2, and Z is:

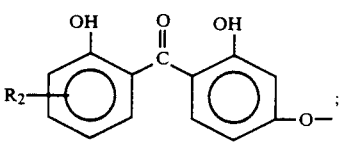

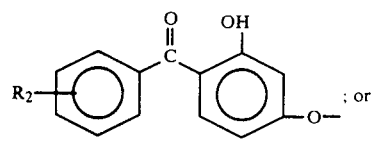

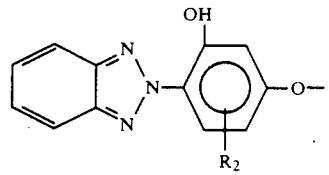

wherein $R_2$ is hydrogen, alkyl or hydroxy and a phenyl benzotriazole of the formula:

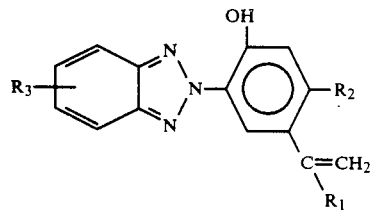

wherein $R_1$ and $R_2$ are as defined above, and $R_3$ is H; alkyl, a $C_1$-$C_{10}$ alkyl, or hydroxyl.

5. An oxygen-permeable lens as claimed in claim 1 in which the hydroxyorganosilicon monomer is present in an amount of from about 0.1 to about 10 percent by weight of the total weight of the monomers.

6. An oxygen-permeable lens as claimed in claim 2 in which the hydroxyorganosilicon monomer is present in an amount of from about 0.1 to about 10 percent by weight of the total weight of the monomers.

7. An oxygen-permeable lens as claimed in claim 4 in which the hydroxyorganosilicon monomer is present in an amount of from about 0.1 to about 10 percent by weight of the total weight of the monomers.

8. An oxygen-permeable lens as claimed in claim 1 in which the oxygen permeability is at least about $50 \times 10^{-11} (cm^2/sec)$ (ml $O_2$ x mm Hg).

9. An oxygen-permeable lens as claimed in claim 2 in which the oxygen permeability is at least about $50 \times 10^{-11} (cm^2/sec)$ (ml $O_2$ × mm Hg).

10. An oxygen-permeable lens as claimed in claim 2 in which the organosilicon monomer system includes a monomer of the formula:

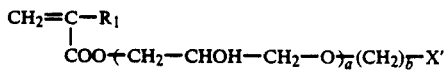

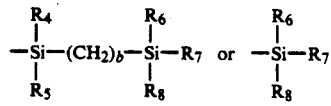

wherein each of R₄ and R₅ is independently a C-C₅ alkyl, phenyl, hydroxyl, or —O—Si(CH₃)₃, and each of R₆, R₇ and R₈ is independently selected from C₁-C₅; —CH₂=CH₂; phenyl; hydroxyl; —CH₂OH;

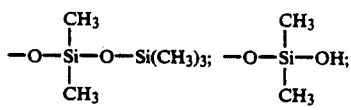

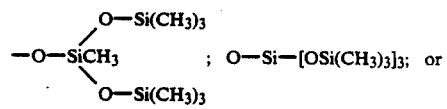

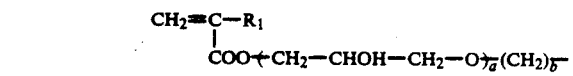

wherein $R_1$ is hydrogen or methyl, a is 0 or 1, and b is from 1 to about 4.

11. An oxygen-permeable lens as claimed in claim 1 in which the organosilicon monomer system is selected from the group consisting of tris(trimethylsiloxy)-γ-methacryloxypropylsilane, 1,3-bis-(γ-methacryloxypropyl-)1,1,3,3-tetra(trimethylsiloxy)disiloxane and mixtures thereof, and in which the hydroxyorganosilicon monomer is hydroxy-di-(trimethylsiloxy)silylpropylmethacrylate.

12. An oxygen-permeable lens as claimed in claim 9 in which the organosilicon monomer system is selected from the group consisting of tris(trimethylsiloxy)-γ-methacryloxypropylsilane, 1,3-bis-(γ-methacryloxypropyl-)1,1,3,3-tetra(trimethylsiloxy)disiloxane and mixtures thereof, and in which the hydroxyorganosilicon monomer is hydroxy-di-(trimethylsiloxy)silylpropylmethacrylate.

13. An oxygen-permeable lens as claimed in claim 1 in which the fluoroorgano monomer is selected from the group consisting of 2,2,2-trifluoroethylemthacrylate, hexafluorobutylmethacrylate, hexafluoroisopropylmethacrylate and mixtures thereof.

14. An oxygen-permeable lens as claimed in claim 2 in which the fluoroorgano monomer is selected from the group consisting of 2,2,2-trifluoroethylmethacrylate, hexafluorobutylmethacrylate, hexafluoroisopropylmethacrylate and mixtures thereof.

15. An oxygen-permeable lens as claimed in claim 1 in which the hydrophilic monomer is methacrylic acid.

16. An oxygen-permeable lens as claimed in claim 2 in which the hydrophilic monomer is methacrylic acid.

17. An oxygen-permeable lens as claimed in claim 10 in which the hydrophilic monomer is methacrylic acid.

18. An oxygen-permeable lens as claimed in claim 3 in which the UV-absorbing monomer is selected from the group consisting of 2-hydroxy-4-(2-methacryloyloxyethoxy)benzophenone, 2-hydroxy-4-(2-acryloyloxyethoxy)benzophenone, 2-hydroxy-4-(2-hydroxy-3-methacryloxypropyl)benzophenone, 2-(2-hydroxy-5-vinylphenyl)-2H-benzotriazole, and mixtures thereof.

19. An oxygen-permeable contact lens formed of a copolymer of monomers comprising:
(a) an organosilicon monomer system present in an amount of from about 30 to about 35 percent by weight based on the total weight of the monomers, including (1) a monomer of the formula:

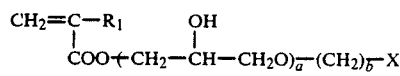

wherein $R_1$ is hydrogen or methyl, a is 0 or 1, b is from 1 to about b 4, and X is an organosilicon moiety containing up to about 16 silicon atoms, and (2) 0.1 to 10 percent by weight of an hydroxy organosilicon monomer having at least one hydroxyl group attached to silicon;

(b) a UV-absorbing agent containing an interpolymerized amount of at least one monomer selected from the group consisting of a hydroxybenzophenone or benzotriazole of the formula:

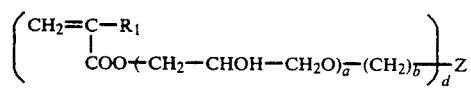

wherein $R_1$, a and b are as defined above, d is 1 or 2, and Z is:

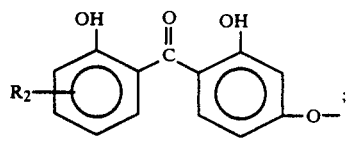

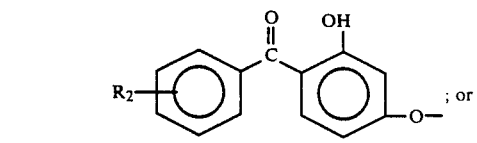

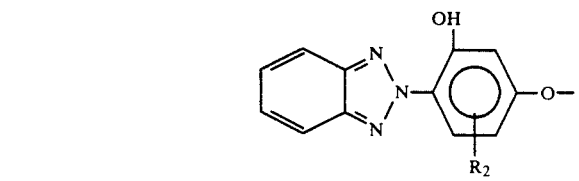

wherein $R_2$ is hydrogen, alkyl or hydroxyl and a phenyl benzotriazole of the formula:

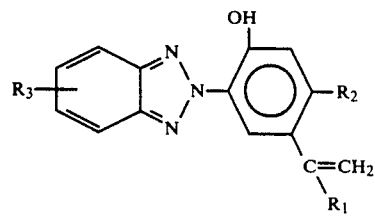

wherein $R_1$ and $R_2$ are as defined above, and $R_3$, is H; alkyl, preferably a $C_1$-$C_{10}$ alkyl, or hydroxyl, said UV-absorbing agent being present in an amount of from about 0 to about 10 percent by weight based on the total weight of the agent and the monomers;
(c) methacrylic acid in an amount sufficient to provide in the resultant polymer a contact angle less than about 45°;
(d) at least one crosslinking monomer, the total of crosslinking monomers being present in a concentration of from about 0.1 to about 2 percent by weight based on the total weight of the monomers; and
(e) fluorinated monomers comprising at least one fluoro-organo monomer of the formula:

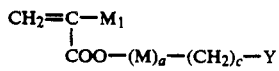

wherein $M_1$ is hydrogen, alkyl, fluoroalkyl, alkyl carboxy, carboxy ester, alkyl carboxy ester, fluorinated carboxy ester, cyano, or phenyl, M is hydroxy alkyl, alkyl ether, or hydroxy alkyl ether, a is a defined above, c is from 0 to 4, and Y is a fluorocarbon group containing from about 2 to about 21 fluorine atoms, said fluorinated monomers present in an amount of about 55 to about 65 percent by weight of the monomers, said lens having a Shore D hardness from about 80 to about 85.

20. An oxygen-permeable lens as claimed in claim 18 in which the organosilicon monomer system is selected from the group consisting of tris(trimethylsiloxy)-γ-methacryloxypropylsilane, 1,3-bis-(γ-methacryloxypropyl)1,1,3,3-tetra(-trimethylsiloxy)disiloxane and mixtures thereof, and in which the hydroxyorganosilicon monomer is hydroxy-di(trimethylsiloxy)silylpropylmethacrylate.

21. An oxygen-permeable lens as claimed in claim 18 in which the fluoroorgano monomer is selected from the group consisting of 2,2,2-trifluoroethylmethacrylate, hexafluorobutylmethacrylate, hexafluoroisopropylmethacrylate and mixtures thereof.

22. An oxygen-permeable lens as claimed in claim 1 in which the UV-absorbing monomer is selected from group consisting of 2-hydroxy-4-(2-methacryloyloxyethoxy)benzophenone, 2-hydroxy-4-(2-acryloyloxyethoxy)benzophenone, 2-hydroxy-4-(2-hydroxy-3-methacryloxypropyl)benzophenone, 2-(2-hydroxy-5-vinylphenyl)-2H-benzotriazole, and mixtures thereof.

* * * * *

UNITED STATES PATENT AND TRADEMARK OFFICE
CERTIFICATE OF CORRECTION

PATENT NO. : 5,002,979
DATED : March 26, 1991
INVENTOR(S) : Nick Stoyan

It is certified that error appears in the above-identified patent and that said Letters Patent is hereby corrected as shown below:

Column 7, line 54, change "sesile" to -- sessile --.

Column 8, line 6, after "absorber" insert a period.

Column 11, line 11, change "AVerage" to -- Average --.

Column 11, line 30, change "on" to -- one --.

Column 13, line 8, insert -- wherein X' is -- before "-Si".
Column 13, line 66, change "methacryloyloxyethoxy" to
-- methacryloxyethoxy --.
Column 13, line 67, change "acryloyloxyethoxy" to
-- acryloxyethoxy --.

Column 14, line 15, delete "b".

Column 15, line 22, before "defined" change "a" to -- as --.

UNITED STATES PATENT AND TRADEMARK OFFICE
CERTIFICATE OF CORRECTION

PATENT NO. : 5,002,979
DATED : March 26, 1991
INVENTOR(S) : Nick Stoyan

It is certified that error appears in the above-identified patent and that said Letters Patent is hereby corrected as shown below:

```
Column 16, line 17, change "claim 1" to -- claim 21 --.
Column 16, line 19, insert "the" before "group".
Column 16, lines 19,20, change "methacryloyloxyethoxy" to
          -- methacryloxyethoxy --.
Column 16, lines 20,21, change "acryloyloxyethoxy" to
          -- acryloxyethoxy --.
```

Signed and Sealed this

Tenth Day of November, 1992

Attest:

DOUGLAS B. COMER

*Attesting Officer*   Acting Commissioner of Patents and Trademarks